Dec. 12, 1950     W. L. KEEFER     2,533,265
TUMBLING MILL

Filed June 23, 1948     7 Sheets-Sheet 1

Inventor
Walter L. Keefer
By Hall & Houghton
Attorneys

Dec. 12, 1950     W. L. KEEFER     2,533,265
TUMBLING MILL

Filed June 23, 1948     7 Sheets-Sheet 4

Inventor
Walter L. Keefer
By Hall & Houghton
Attorneys

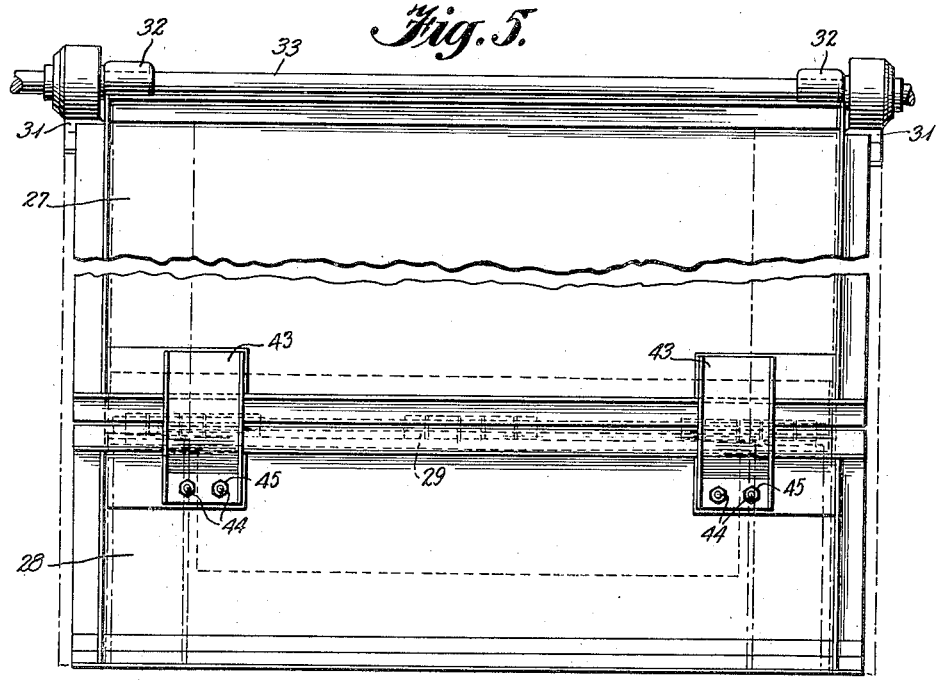
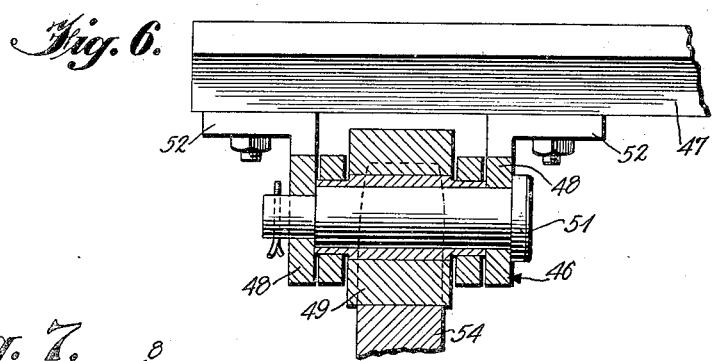
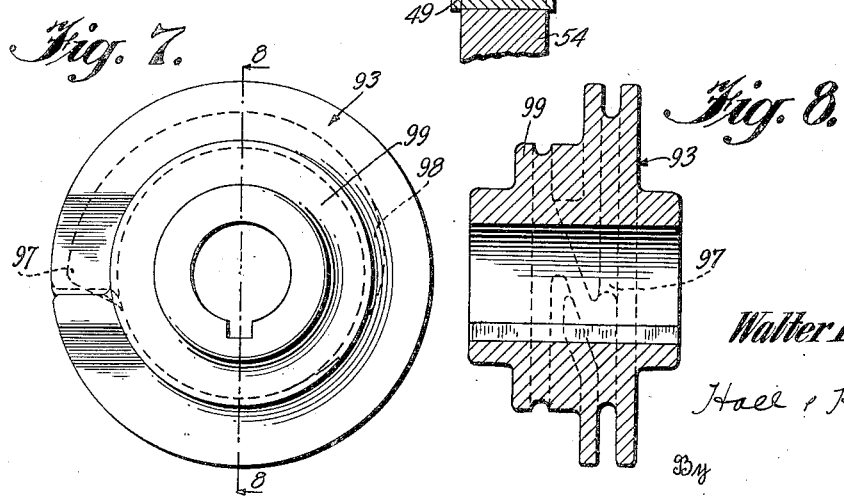

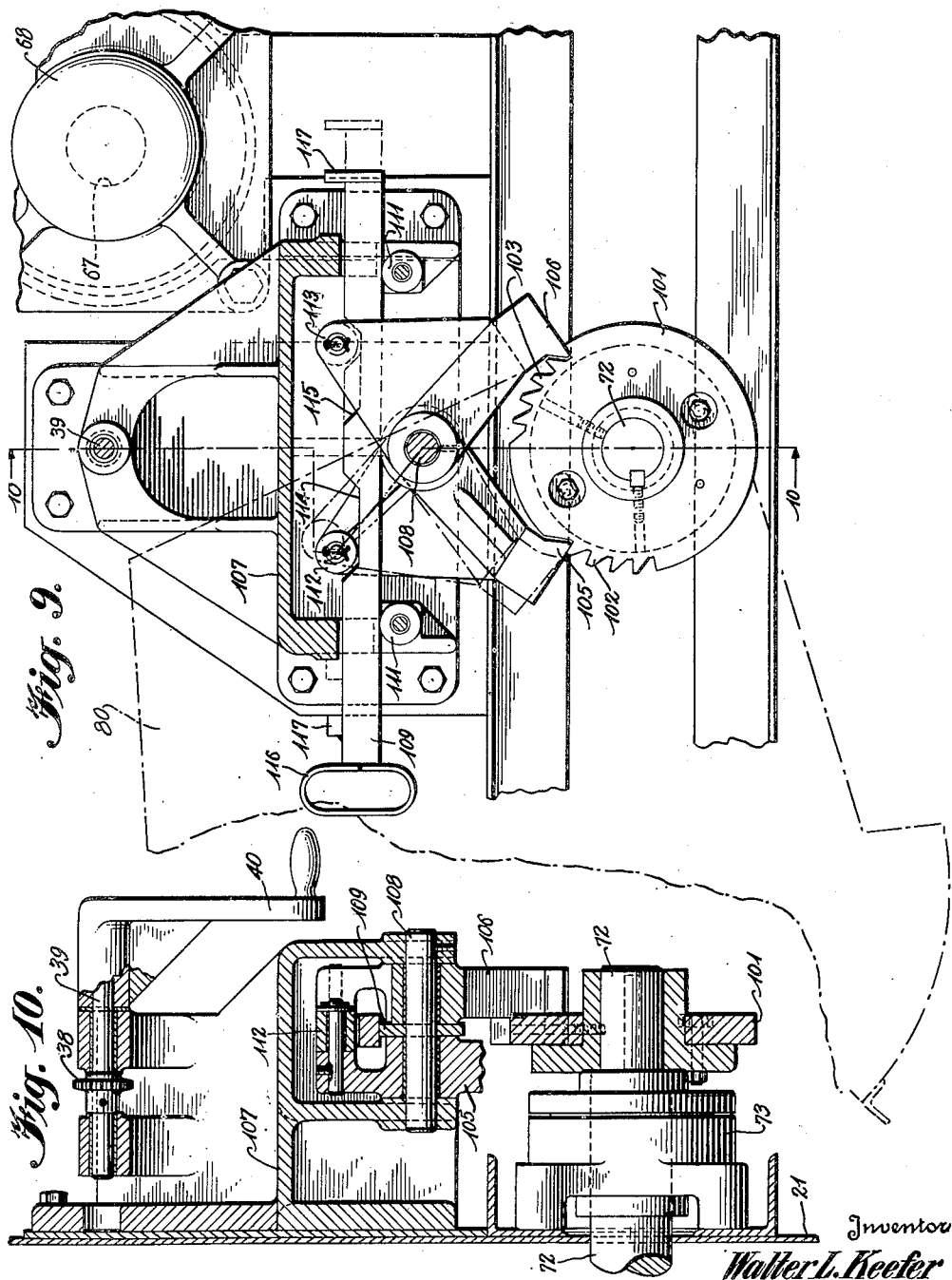

Dec. 12, 1950     W. L. KEEFER     2,533,265
TUMBLING MILL
Filed June 23, 1948     7 Sheets-Sheet 7
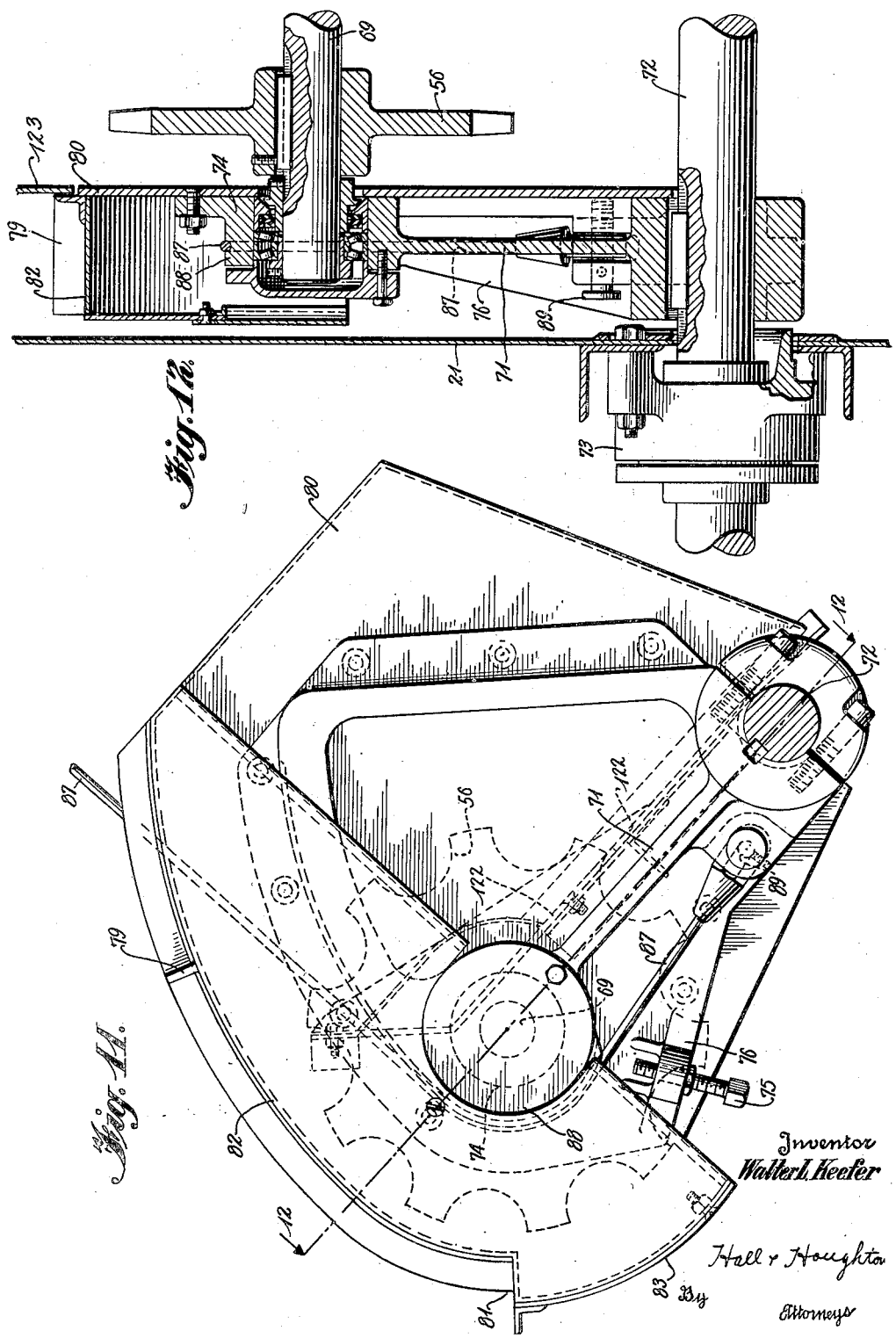

Patented Dec. 12, 1950

2,533,265

UNITED STATES PATENT OFFICE 2,533,265

TUMBLING MILL

Walter L. Keefer, Hagerstown, Md., assignor to Pangborn Corporation, Hagerstown, Md., a corporation of Maryland Application June 23, 1948, Serial No. 34,684

14 Claims. (Cl. 51—13)

This invention relates to tumbling mills or barrels, and more particularly to a machine of this character which employs a travelling, endless work supporting conveyor, or belt, movable in one direction for effecting tumbling and in a reverse direction for effecting the discharge of the treated work and including widely spaced apart bights and a run therebetween travelling in a concave path and providing a receptacle for receiving the articles to be treated and in which they are tumbled during treatment. Machines of this type are disclosed in British Patent 4,724 of 1911 to Ochs, and in U. S. Patent 1,567,077 to Louis D. Peik dated December 29, 1925.

The aforesaid British Patent shows in Figure 6 a tumbling mill which includes a travelling, endless work supporting conveyor which is formed with two bights to provide a receptacle for the articles to be treated, the conveyor being bodily movable from one position which will retain and tumble the articles in the receptacle, to another position which will cause discharge of the articles from the conveyor while the conveyor continues to move in the same direction that causes tumbling of the articles. This conveyor is housed in a casing which has an upper doorway in its front side through which the articles are charged on the conveyor when it is in tumbling position and also has in the front side a lower doorway through which the articles are delivered from the conveyor when it is in discharging position. In Figure 5 of this British Patent is shown a similarly arranged conveyor, but discharge of articles from the conveyor is effected by reversing the direction of movement of the conveyor.

The aforementioned Peik patent discloses a tumbling mill which includes an endless conveyor movable in only one direction and which is formed with two bights to provide a shallow receptacle for the articles to be treated, the conveyor being bodily movable from one position to which one bight is higher than the other to cause tumbling of the articles on the conveyor, to another position in which the high bight becomes the low bight over which the articles will be moved to discharge them from the conveyor.

These prior machines have not, however, been satisfactory for several reasons. As their work receiving receptacles have been of shallow depth, they have been capable of carrying only a relatively small amount of work. This limitation has arisen because with these prior machines it has been necessary to have the low side of the receptacle at a low level so that the work will be discharged thereover upon movement of the conveyor in a reversed direction to discharge the work over this low side. Moreover, due to the low elevation of this lower bight of the conveyor it has been possible for the work to move over this low side and out of the conveyor during tumbling operations.

Another serious disadvantage of these prior machines has been that they have required an exceptionally large casing in order to permit the bodily movement of the conveyor from the position in which tumbling of the articles takes place, to the position of the conveyor for accomplishing discharge of the work from the conveyor. This has required an undesirably large amount of floor space.

Also, with these prior machines, work-pieces have often become pinched between the conveyor and the head ends for the conveyor receptacle, where the conveyor approaches these head ends. Moreover, with these machines, the work frequently becomes pinched between the conveyor and the tote box when the conveyor is being discharged and this is because the conveyor does not extend sufficiently far over the tote box to be certain that the work will drop therein.

It is an object of the present invention to eliminate these disadvantages of the machines of the prior art, and this is accomplished by providing a quite different arrangement for supporting the conveyor whereby the lower bight can be moved from an upper position in which it is placed for tumbling, to a lower position in which it is placed for discharging the work.

Another object of the present invention is to provide a tumbling barrel utilizing a travelling endless conveyor, in which a deep trough is formed so that a considerable quantity of work can be tumbled at one loading without the probability that some of the work will accidentally roll over the low side and out of the tumbling barrel.

Another object of the present invention is to provide a tumbling barrel in which the workpieces cannot become pinched between the conveyor and the head ends, and in which the workpieces will not become pinched between the conveyor and the tote box.

Another object of the invention is to provide a tumbling barrel utilizing a travelling, endless conveyor which is housed in a housing having an upper doorway through which work is charged upon the conveyor, and having a lower doorway through which the work is delivered from the conveyor, the front bight of the conveyor being movable to an upper position to form a deep receptacle to receive the work being charged through the upper doorway, and the front bight being movable to a lower position so that the work being delivered from the conveyor will pass out of the lower doorway.

A still further object of the invention is to provide means for counterbalancing the front bight of the conveyor in its lowering and raising movement so that an increasing counterbalancing force is applied when the front bight is in its lower position to thereby check the downward movement of the front bight and to also assist its upward movement.

A preferred embodiment of the invention is illustrated in the accompanying drawings in which:

Fig. 5 is a view on the line 5—5 of Fig. 2 on an enlarged scale.

Fig. 6 is a sectional view through one of the chains, on an enlarged scale.

Fig. 7 is a side elevational view of one of the differential sheaves, on an enlarged scale.

Fig. 8 is a sectional view on the line 8—8 of Fig. 7.

Fig. 9 is a sectional view on the line 9—9 of Fig. 1 on an enlarged scale.

Fig. 10 is a sectional view on the line 10—10 of Fig. 9.

Fig. 11 is an enlarged view of the right hand end of the movable support for the front sprocket for the conveyor.

Fig. 12 is a sectional view on the line 12—12 of Fig. 11.

Figure 1:
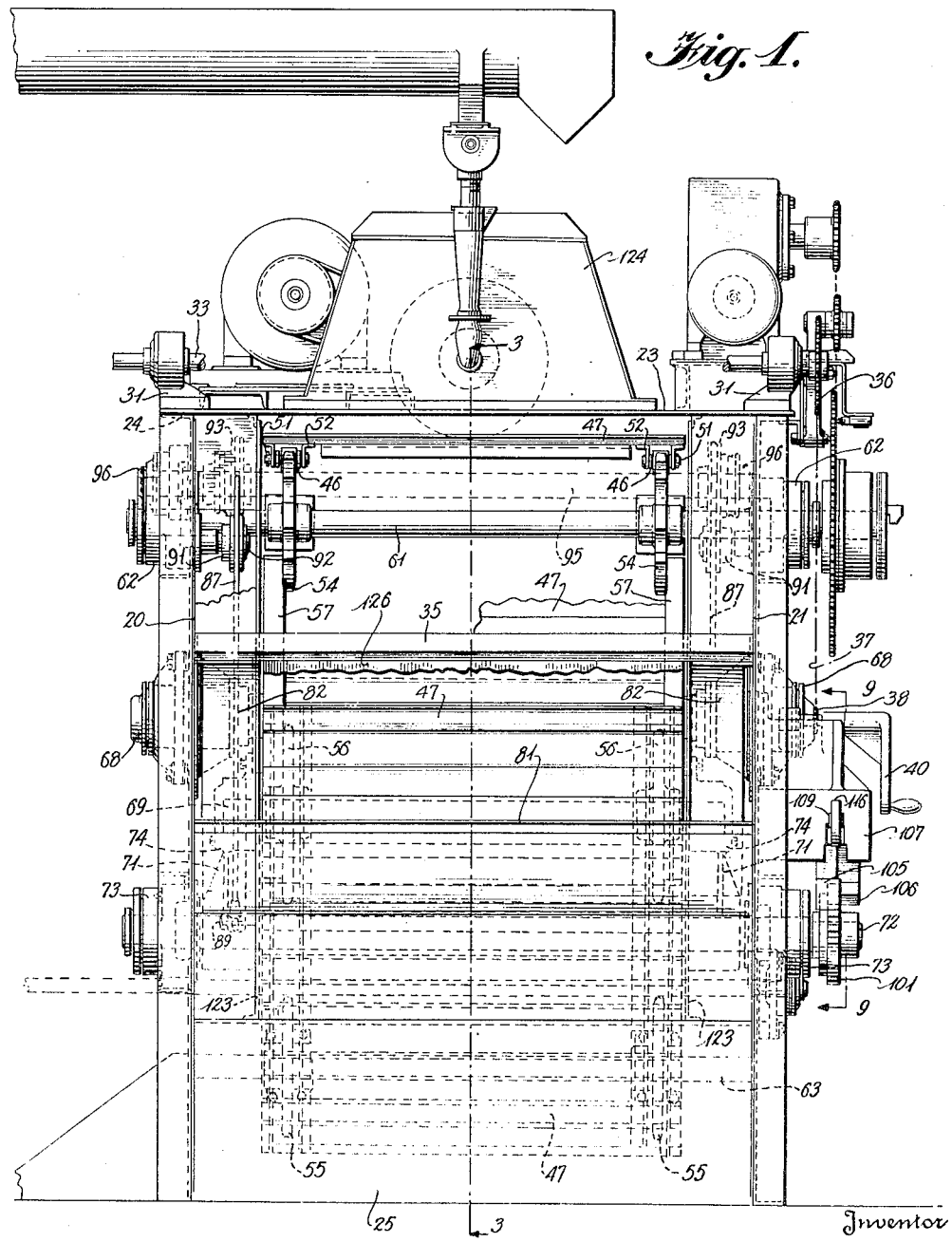
Fig. 1 is a front elevational view of the barrel with the front door removed and portions of the conveyor broken away.

The casing of the barrel is made up of side walls 20 and 21, a rear wall 22 and a top wall 23. These walls are plates which are preferably strengthened by reinforcing bars attached to them. The plates are attached together at their edges by angle beams such as 24 which appear in Fig. 3. The lower part of the front of the casing is closed by an upright plate 25 which is turned inwardly at its upper end to enter the interior of the casing and then inclines downwardly to the base as shown at 26. This inclined portion 26 carries any abrasive which falls on it, to the rear of the casing.

Figure 2:
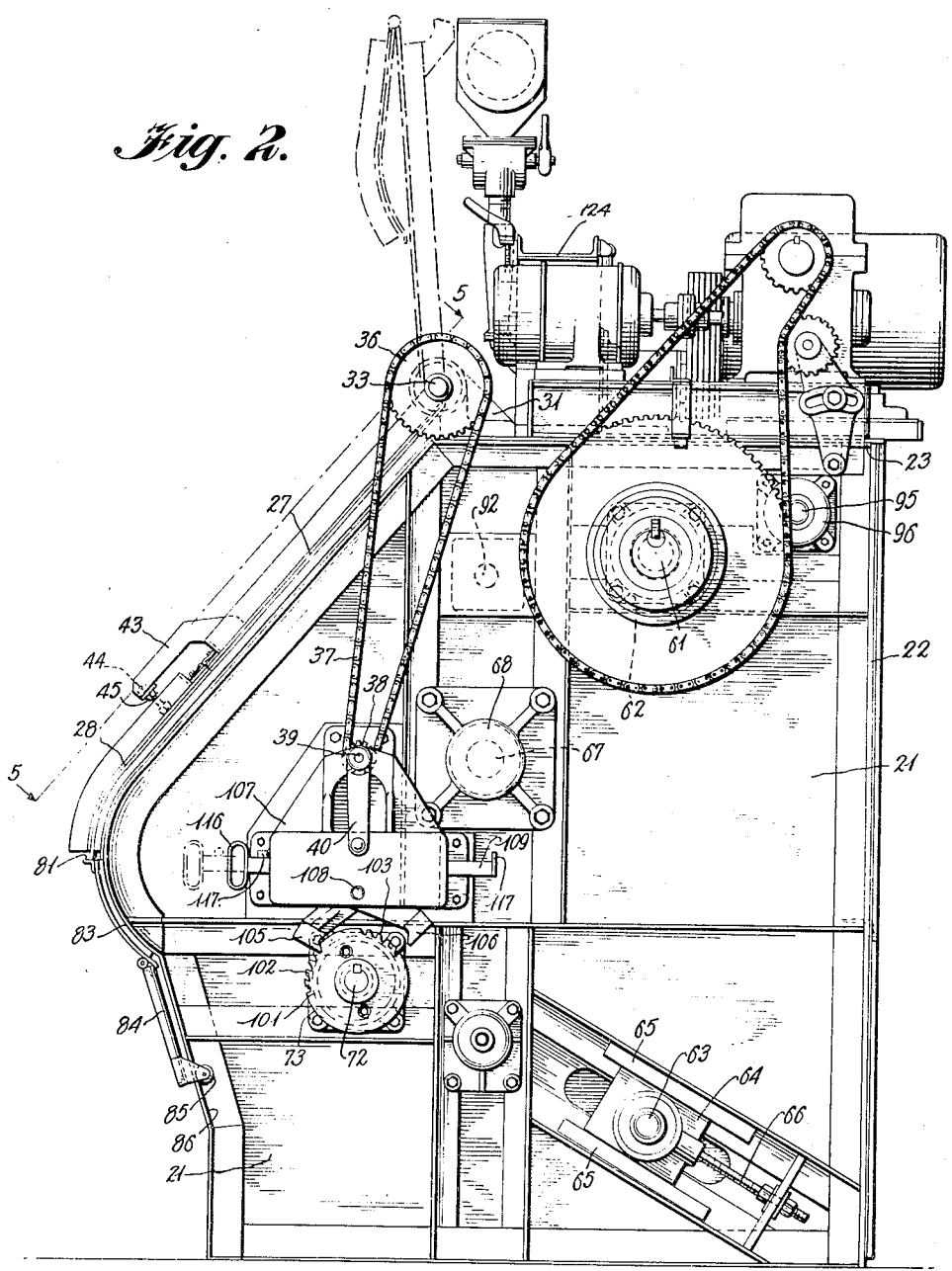
Fig. 2 is a side elevational view of the barrel.

The opening at the upper part of the front of the casing is closed by a door made up of an upper panel 27 and a lower panel 28. These panels are hinged together at 29 so that when the upper panel is turned upwardly, the lower panel will fold downwardly thereagainst as shown in dotted lines in Fig. 2. It is preferable that the panels 27 and 28 be reinforced by beams attached thereto. The inner faces of the door panels are preferably covered with heavy rubber sheeting to sustain the wear of abrasive striking against it.

The top of the upper door panel 27 is hinged to the front edge of the top plate 23. This hinge includes brackets 31 attached to the top plate 23 at opposite sides thereof, and brackets 32 which are fastened to the upper edge of the door panel 27. These brackets 31 and 32 are apertured in line with each other to receive a pivot rod 33 which passes therethrough and serves as the main hinge for the door.

It will be observed that the upper door panel 27 is longer than the lower door panel 28 and that when they are in closed position the lower edge of the upper panel 27 rests on a cross beam 35 at the front of the casing. This cross beam is attached at its ends to the side walls 20 and 21 at such a height as to define the charging opening thereabove and the discharging opening for the barrel therebelow.

The door is opened by turning rod 33 and for this reason the door brackets 32 are pinned to rod 33 and a large chain sprocket 36 is also attached to this rod. This sprocket 36 is driven by a chain 37 which passes around a small sprocket 38 secured to a shaft 39. A handle 40 is also attached to shaft 39 and as it is within easy reach of the attendant it may be turned to thereby rotate the hinge rod 33 and raise or lower the door.

It is intended that the weight of the door be relied upon to hold it in closed position, but if desired, locking means may be provided to hold it down. Means are, however, preferably provided to utilize the weight of the upper door panel to retain the lower door panel closed. This includes brackets 43 which are attached at opposite sides of the upper panel and which extend downwardly to overhang the lower door panel 28. To the lower extremities of the brackets 43 are threaded bolts 44 (Fig. 3) which may be adjusted to bear on the lower door panel when the door is closed and hold it downwardly in place. The bolts may be retained in adjusted position by locking nuts 45.

The space between the lower edge of the lower door panel 28 and the top of the upright front plate 25 is closed by means which will hereinafter be described. It may be observed here however that the entire front of the cabinet is closed during tumbling operations.

The conveyor which supports the work to be tumbled is made up of two spaced chains 46 which are connected by cross slats 47. The chains are made up of side links 48 and rollers 49 which are interconnected by pins 51. It will be observed that the side links 48 are of angular construction so that they form seats 52 to which the cross slats 47 of the conveyor are attached.

The cross slats 47 are wider than the pitch of the chain so that the edges of adjacent slats overlap. To accommodate this overlapping, one long edge of each slat is raised or offset at 53 to overlie the edge of the adjacent slat. It is preferable that the slats be slightly curved at their overlapping edges so that they tend to maintain the same spaced relationship as the chain links pivot relative to each other. When the cross slats are disposed, however, to form the trough to hold the work-pieces, it will be noted that the raised edge 53 of the one slat comes close to the surface of the underlying slat to nearly form a seal. A substantially continuous surface is thereby formed.

The chains 46 pass around an upper pair of sprockets 54, at the upper rear of the cabinet, a lower pair of sprockets 55 at the lower rear of the cabinet, and a front pair of sprockets 56 at a midway height. The upper run or span of the conveyor passes around a pair of circular drum heads 57 which define the shape of the trough in which the work rests. To sustain the downward pressure of this load, a pair of rails 58 is located below the drum heads for the rollers 49 to bear upon. These rails are carried by the side plates 20 and 21.

The upper pair of sprockets 54 are secured to a shaft 61. This shaft 61 is rotatably mounted in bearing bosses 62 carried by the side plates 20 and 21. As these sprockets are fastened to the shaft 61, the chains are caused to move together and maintain the crosswise relationship of the slats. The shaft 61 extends to the outside of the casing and a pulley or sprocket is attached thereto to rotate the shaft and thereby move the conveyor, as will be explained later.

The lower pair of sprockets are attached to a shaft 63 which turns in bearing blocks 64. These bearing blocks are movable in guideways 65 (Fig. 2) carried by the side plates 20 and 21 and the blocks 64 can be held in an adjusted position by means of adjustment bolts 66. By moving the shaft 63 in a direction generally away from the upper sprockets 54 and the front sprockets 56, the chains 46 can be tightened to the desired tautness.

Each drum head 57 is attached to its own stud shaft 67 which is rotatably mounted in a bearing boss 68 carried by the adjacent side plates 20 and 21. The slats 47 of the conveyor come into contact with the periphery of the drum heads 57 and the drum heads are thereby rotated. It may be noted that the inner faces of the drum heads are preferably lined with steel wear plates to prevent wear on the metal of the drum heads.

It has been mentioned that an important feature of the invention resides in the movability of the lower side of the conveyor trough from an upper work tumbling position, to a lower work discharging position. To carry this out the front sprockets 56 over which the chains 46 pass are attached to the shaft 69 and this shaft is mounted for up and down movement.

As here shown the up and down movement of the shaft 69 is accommodated by rotatably supporting it in two spaced swinging arms 71. These arms 71 are on opposite sides of the conveyor slats so that the conveyor moves between them. The rearward ends of the arms are attached to a shaft 72 which can turn in bearings 73 which are carried by the side plates 20 and 21. The sprocket shaft 69 turns within bearings 74 at the forward ends of arms 71 so that a swinging movement of the arms carries the sprocket shaft up or down.

To limit the downward movement of the arms 71 they are provided with adjusting screws 75 which are threaded in lateral lugs 76 of the arms. These adjusting screws strike against the stops 77 to prevent further downward movement of the arms 71. To limit the upward movement of the arms 71, they are provided with stops 79 (mounted on side plate 20 flanges) which strike against adjusting screws 78 as the arms move up. Adjusting screws 78 are mounted in blocks interposed between side plates 20 and 21 and wear plates 123.

Figure 4:
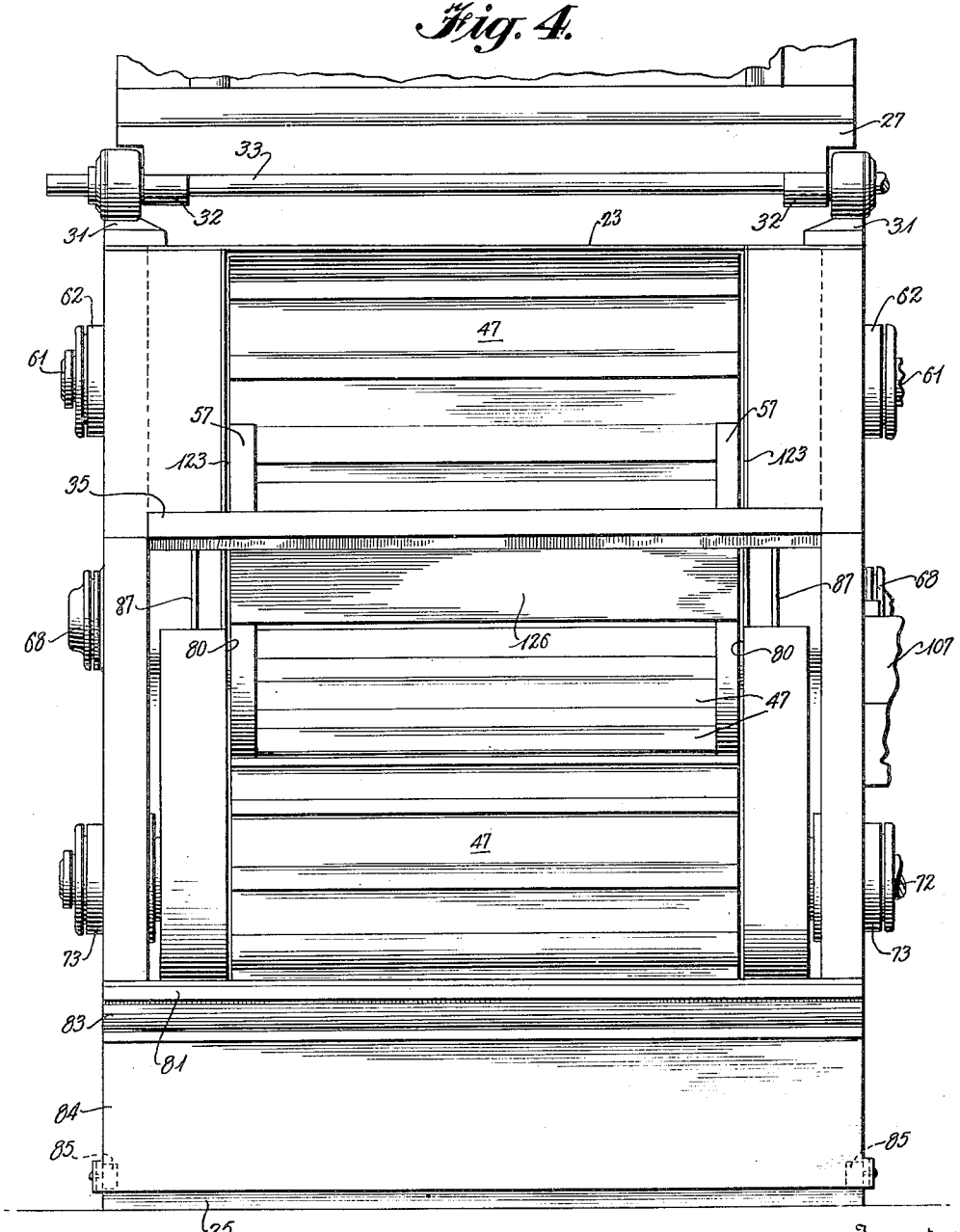
Fig. 4 is a front elevational view on an enlarged scale, with the front door open, and the front end of the conveyor in lowered position.

Attached to the inner side of swinging arms 71 are plates 80. These plates extend outwardly beyond the arms and carry extending flanges 82 which surround and cover the arms 71 and carry upper locating stops 79. Projections from these flanges overlap wear plates 123 closing the joint between the two parts. The flanges 82 of plate 80 are offset forwardly as at 81 so that the lower portion of the lower door panel 28 will extend inward of plate 83 when the door is closed, thereby closing the joint between the two parts. As these arm plates 80 are close to the ends of the conveyor slats 47 (Fig. 4), the upper portions of the plates 80 serve as sides for the conveyor when it is in a lowered position and the work is being discharged.

It has been mentioned that there is a space between the lower edge of the lower panel 28 and the upper part of the upright front plate 25. This space is closed by sheet members carried by the arm plates 80. These sheet members include a curved sheet 83 which is fastened to the front edges of the arm plates so as to extend from the lower edge of the lower door panel, downwardly about half way to the top of plate 25. To the lower edge of the sheet 83 is hinged a sheet 84 which closes the remainder of the gap to plate 25.

During upward and downward movement of the swinging arms 71, the hinged sheet 84 moves downwardly along the outer face of the upright plate 25. To guide the sheet 84 in this movement, rollers 85 are attached to the lower ends of the sheet 84 and these rollers bear against the rearward faces of laterally projecting flanges 86 attached to the forward edges of side plates 20 and 21.

Counterbalance means are provided to offset the weight of the swinging arms 71, the several elements attached thereto and the portion of the conveyor supported thereby. This means includes cables 87 which pass around circular bosses 88 on the outer sides of the arms 71 and which are anchored upon pins 89 attached to the arms. The bosses 88 are grooved to receive the cables and the provision of these bosses 88 serves to prevent any sharp bends in the cables as the arms 71 move.

From the arms 71, the cables 87 pass upwardly and over pulleys 91 which are rotatably mounted on stud shafts 92 supported by the side walls 20 and 21. From the pulleys 91 the cables pass rearwardly over sheaves 93 at the rear upper portion of the cabinet. Counterweights 94 are attached to the ends of the cables. The sheaves 93 are attached to a cross shaft 95 which is rotatably mounted in bearing bosses 96 carried by the side walls 20 and 21.

Although the sheaves 93 could be simple pulleys over which the cables pass, the invention provides as an important feature thereof, means for decreasing the upward pull on the arms 71 as they move from their lower to their upper position. For this reason the sheaves 93 are made of spiral formation in both an axial and a radial direction. Due to the axially spiral formation the cable passes a full turn and a quarter around the sheave while the cable radially approaches the axis of the sheave.

When the swinging arms are up, the cables 87 lead from them to the most radially distant part 97 of the sheaves. The cables 87 then pass around the sheaves while moving radially inwardly over the decreasing portion 98 which is approximately three-fourths of a turn in extent. The cable then passes over a circular portion 99 of uniform radius and which is at least a half a turn in extent. The sheaves 93 should be of such a radial size that they will turn about three-fourths of a rotation as the arms move from their upper to their lower limit.

As the arms 71 move downwardly the cables 87 maintain a constant radial distance from the axis of the sheaves 93 as the cables unwind from the counterweight side of circular portions 99 of the sheaves. The pull of the counterweights therefore exerts a constant torque on the sheaves as the arms 71 move upwardly. However, the portions of the cables leading from the high points 97 of the sheaves 93, drop off of these high points with the consequent result that a gradually decreasing pull is exerted on the arms 71 as they move upwardly and the cables wind on the sheaves.

It will be apparent from this that the greatest upward pull is exerted on the arms when they are downmost and that as they move upwardly and a decreasing pull is exerted on them, they will not gain sufficient speed so that they will exert a hard blow when they reach the top of their movement. The counterweights exert their greatest force only at the start of the upward movement of the arms, when it is most needed. Likewise when the arms are being lowered, the counterweights exert their greatest force when the arms are approaching their lower limit and this serves to arrest the downward movement of the arms so that the shock of stopping is decreased.

It will be evident that when the swinging arms 71 are uppermost and the front sprockets 56 for the conveyor are at their top limit, a deep concave trough will be formed by the conveyor. It will be observed that the low side of the conveyor at this time comes up to about the level of the axis of the drum heads 57. Because of the unusual depth of the trough which is formed, sufficient work pieces can be loaded upon the conveyor to be about equal to half the volumetric contents of a cylinder defined by the drum heads.

As a consequence of this, during tumbling operations the line of repose of the load will about pass through the axis of the drum heads. Despite the considerable amount of work in the barrel, the work-pieces, after cascading down the inclined face of the work, will not roll over the low side of the conveyor trough due to the unusually high elevation of this side as has been noted. Also, due to the height to which the low side rises, work pieces will not become pinched between the conveyor and the drum heads during tumbling.

Because of the large amount of work which can be handled by the conveyor, it is important that the upper sprockets 54 for the conveyor be brought forwardly so that the conveyor passes around a considerable portion of the upper quadrants of the drum heads. It will be observed that the conveyor is brought forwardly around the tops of the drum heads about half way to a vertical plane through the axis of the drum heads.

When tumbling is completed, the direction of movement of the conveyor is reversed. This carries the work toward the low side of the trough and this weight upon the arms 71 may be relied upon to swing them down to their lower position. Continued reversed movement of the conveyor will carry the work outwardly over the now lowered portion of the conveyor so that the work will be discharged from the barrel into a tote box. In this lowered position the conveyor extends nearly horizontally away from the lowermost part of the drum heads and as the work consequently does not have to be moved upwardly to discharge it, complete assurance is had that all the work will be discharged at once.

When the conveyor is in its lowered position it is desirable that it and its supporting chains 46 remain taut. As the downward swinging movement of the front sprocket 56 serves to introduce a slack in the chains 46, chain supporting rails 100 (Fig. 3) are located below the lowermost run of the conveyor. These supporting rails 100 are of humped shape so that the conveyor is curved upwardly over them as the front sprockets 56 are lowered. By having approximately the shapes shown, these rails 100 will take up the slack which would otherwise occur.

It will be apparent that the shaft 72 to which the swinging arms 71 are affixed, may be turned either manually or by power means to move the front end of the conveyor to its upper or its lower position, but as will be explained later, this movement may be brought about automatically.

As it is advisable to lock the swinging arms 71 in their lower or upper position, means are provided for this purpose. This includes a ratchet gear 101 having two sets of teeth 102 and 103. These sets of teeth are oppositely inclined so that the teeth 102 serve to hold the front of the conveyor in its lowered position and the teeth 103 serve to hold the front of the conveyor in its upper position. A pawl 105 in the shape of a bell-crank lever engages with the teeth 102 and another pawl 106 in the shape of a bell-crank lever engages with the teeth 103.

To support the pawls 105 and 106 and their operating elements, a frame 107 is attached to the side wall 21 above the ratchet 101. This frame 107 has a downwardly opening hollow interior into which the upper ends of the pawls 105 and 106 extend. The pawls are both pivoted upon a common pin 108 carried by the side walls of the frame. The pawls 105 and 106 are offset at their portions which receive the pivot pin 108 so that their lower ends will be in line with each other and bear upon the ratchet 101.

To lift the pawls 105 and 106 from the ratchet 101, a sliding bar 109 is movably carried by the frame 107. This slide bar 109 passes through openings in the ends of the frame 107 and it may rest on rollers 111 carried by the frame ends. The pawls 105 and 106 extend above the slide bar and to their upper ends are rotatably attached rollers 112 and 113 respectively. These rollers 112 and 113 overlie the slide bar 109 and immediately beneath them the top side of the slide bar is formed with depressions 114 and 115. When the slide bar is in its central position, and both rollers 112 and 113 are in their respective depressions 114 and 115, both pawls 105 and 106 will be in engagement with their corresponding teeth 102 and 103.

Rearward movement of the slide bar 109 will cause the roller 113 to be lifted up out of the depression 115 and upon the top of the slide bar 109 and this will raise the pawl 106 away from the teeth 103. Forward movement of the slide bar 109 will in like manner raise the roller 112 up out of depression 114 and this will lift the pawl 105 away from teeth 102. When the slide bar 109 is in its central position both pawls will be in their respective teeth and the ratchet 101 cannot move in either direction, irrespective of what position it may be in.

When the front end of the conveyor is to be dropped, the slide bar is grasped by its handle 116 and is drawn forwardly to lift pawl 106. The shaft 72 to which the swinging arms 71 are attached can then turn to permit the front end of the conveyor to lower. When the direction of the conveyor is reversed to discharge the work-pieces, the weight of workpieces upon drop portion of the conveyor will cause the arms 71 to be lowered so discharge can be effected. The slide bar should be left rearwardly as the pawl 106 will remain in the teeth 103 and prevent an upward movement of the swinging arms. When the front end of the conveyor is to be raised, the sliding bar 109 should, of course, be pushed rearwardly front to thereby lift pawl 105 from its teeth 102. As the balance weights 94 slightly overbalance the movable conveyor front when it is empty, the front will then go up of its own accord. Stops 117 on slide bar 109 limit its movement.

Figure 3:
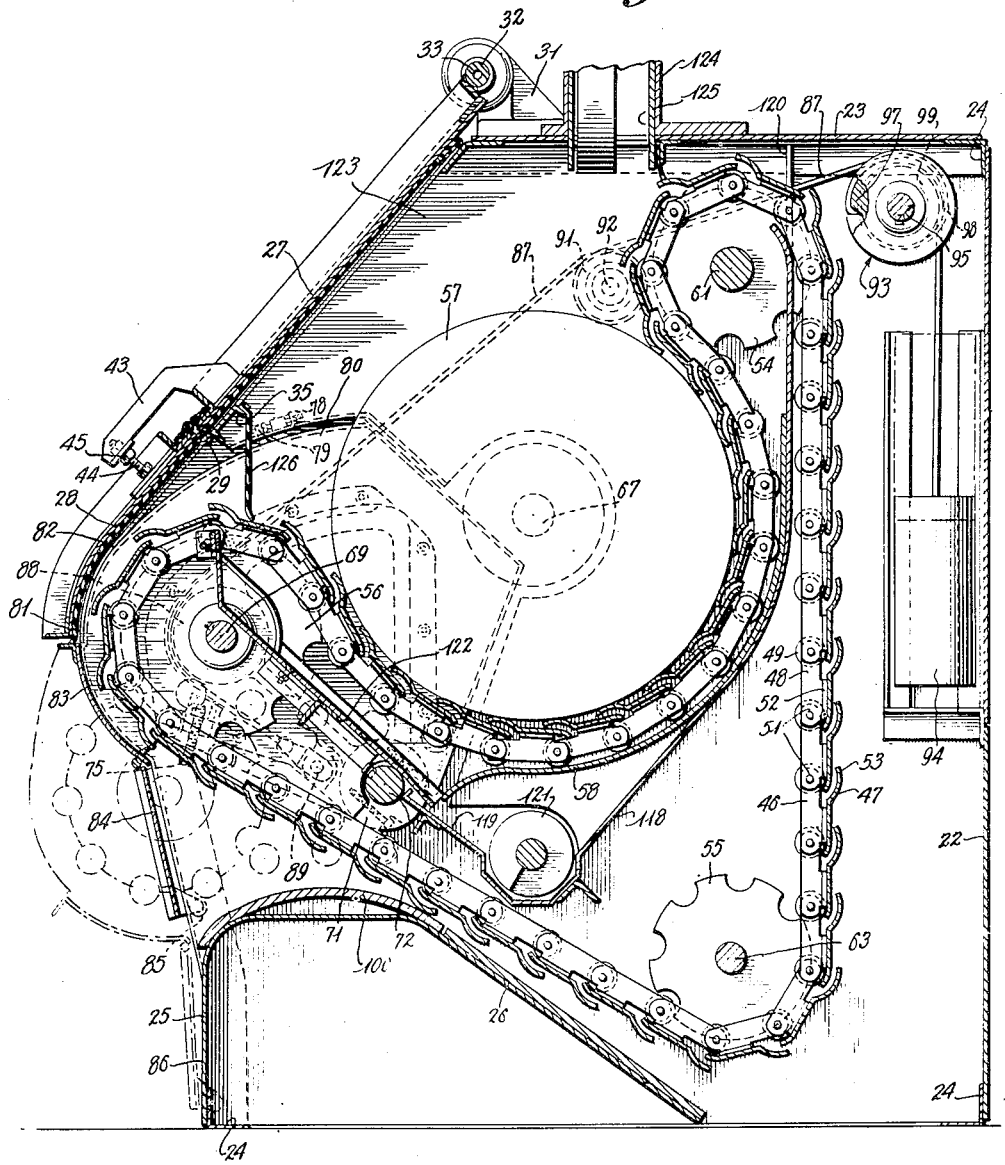
Fig. 3 is a sectional view on the line 3—3 of Fig. 1.

Within the cabinet are several partitions to confine the spread of the abrasive and to collect it so that it can be reused. This includes a V- shaped partition which is located between the upper and lower runs of the conveyor and which has a rearward wall 118 and a front wall 119 (Fig. 3). The rear wall 118 passes upwardly behind the upper run and close to the top of the casing at which point it is suspended from the top plate 23 by means of hangers 120 disposed outside of the conveyor travel. The front wall 119 extends upwardly close to the shaft 72 for the arms 71.

At the lowermost part of the V partition is a screw conveyor 121 which carries the abrasive to one side of the cabinet to an elevator so that it can be carried upwardly for reuse in the blasting apparatus. The details of this mechanism have not been illustrated as it forms no part of the present invention.

To extend the front wall 119 forwardly, a plate 122 is carried between the plates 81 which are attached to the swinging arms 71. This plate 122 extends from forwardly of the front shaft 69, downwardly and rearwardly to a point overlying the inclined front wall 119. Abrasive which falls on the plate 122 is thereby carried to the screw conveyor 121.

Immediately outside of the conveyor and the drum heads, are preferably positioned wear plates 123. These plates may be attached to the top plate 23 and extend downwardly to below the screw conveyor 121. These wear plates 123 prevent abrasive from reaching the side plates 20 and 21 and can be replaced much easier than the side plates could be replaced. Also, the wear plates 123 prevent abrasive from reaching the cables 87 and their pulleys 91 and sheaves 93.

To confine the abrasive within the tumbling chamber, and prevent it from striking against the lower door portion and possibly escaping from the machine, a rubber sheet 126 may be suspended from the cross beam 35, as shown in Fig. 3. This may extend the full width between vertical plates 123.

The abrasive throwing machine 124 is positioned on the top plate 23 and the stream of abrasive which it projects passes downwardly through an opening 125 in the top plate 23 to reach the work-pieces being tumbled by the conveyor. This abrasive throwing machine may be of the construction described and claimed in Patent No. 2,352,588, issued to Rosenberger and Keefer on June 27, 1944. This abrasive throwing machine should be so disposed that the fan shaped stream of abrasive which it throws is disposed with its longer dimension generally parallel to the axis of the barrel, and the stream should extend across the full width of the barrel between the head ends 57.

It is best to locate the abrasive throwing machine 124 so that its stream is close to the topmost path of the conveyor. By having this relationship the abrasive stream strikes the upper part of the pile of work and abrades the workpieces as they start to cascade down the inclined face of the pile.

The motors for driving the abrasive throwing machine 124 and for driving the conveyor may be mounted upon the top plate 23 of the cabinet.

What is claimed is:

1. In a tumbling mill and in combination, a casing having vertically spaced apart charging and discharging doorways and an intact portion therebetween, an endless reversible belt mounted in the casing having a section travelling in a substantially fixed path, and a second section travelling in alternate paths and forming, with the first section, a substantially semi-circular bottom wall of a work-receiving receptacle, the upper edge portion of the second section remote from the first section occupying, in the travel of the belt in one direction, a position adjacent the top of the lower doorway, and registering with said doorway in the travel of the belt in a reverse direction.

2. In combination in a tumbling mill, a casing having a front opening, an endless conveyor in the casing having upper and lower runs, means engaging the lower run to maintain the conveyor taut, rotatably mounted cylindrical drum heads shaping a central portion of the upper run into an arcuate formation to define a trough for receiving the work-pieces, an upper bight forming means at the rear of and at a level above the tops of said drum heads, a front bight forming means which is disposed at approximately the height of the axis of said drum heads during movement of the conveyor in a tumbling direction to thereby shape said trough as a deep receptacle, means for adjustably supporting said front bight forming means whereby it may be lowered to a position at which the front portion of the upper run extends substantially horizontally from said drum heads, and means for reversing the conveyor so that the work-pieces will be discharged over said substantially horizontal portion.

3. In a tumbling mill and in combination, a casing having a frame member transversely across one end thereof, said frame member defining the top of a lower doorway and defining the bottom of an upper doorway, an endless conveyor having an upper run and a lower run, driving means for moving the conveyor in one direction for tumbling work-pieces on the upper run of the conveyor and for reversing the conveyor movement for discharge of the work-pieces, and guide means for shaping the path of movement of the upper run into a trough shape for tumbling operation and with one side of the trough at approximately the height of said transverse frame member whereby the conveyor can be charged through the upper doorway, and said guide means being adjustable to shape the path of movement of the upper run into substantially right angular shape with said one side lowered to be substantially horizontal whereby on reversal of the conveyor the work-pieces will be discharged through the lower doorway.

4. In a tumbling mill and in combination, a casing having a frame member transversely across one end thereof, said frame member defining the top of a lower doorway, and defining the bottom of an upper doorway, an endless conveyor having an upper run and a lower run, driving means for moving the conveyor in one direction for tumbling work-pieces on the upper run of the conveyor and for reversing the conveyor movement for discharge of the work-pieces, and guide means for shaping the path of movement of the upper run into a trough shape having one side high and one side low and at approximately the height of said transverse frame member whereby a deep trough is formed which can be charged through the upper doorway, driving means for moving the conveyor in a direction to carry work-pieces in said trough toward the higher side, and means for adjusting said guide means to shape the path of movement of the upper run into substantially a right angular form in which said formerly low side extends substantially horizontally, and reversing means for moving the conveyor in the opposite direction to carry work-pieces over the horizontal extension to discharge them from the barrel through said lower doorway.

5. In a tumbling mill and in combination, a casing having a charging doorway in it front wall, and also having a discharging doorway in said wall spaced apart from and below the charging doorway, a belt guiding means in the casing presenting a substantially arcuate guiding surface contiguous each of the side walls of the casing, an endless belt having a first bight at the rear of the belt guiding means and above a horizontal plane intersecting the axis of said arcuate guiding surfaces, and a second bight at the front of said guiding surfaces, the belt also having a run between said bights conforming during the charging and tumbling operations to said guiding surfaces for providing a deep receptacle or pocket, a support in fixed position engaging the portion of the belt forming the first bight, a second support engaging the portion of the belt forming the second bight. means for raising the last named support for elevating the front portion of the run and for lowering it to a position for causing the front portion of the strand to travel in a path not substantially above a horizontal plane, means for driving the belt in one direction during charging and tumbling and in a reversed direction for discharging, and means cooperating with the belt remote from said run for maintaining the latter substantially taut.

6. In a tumbling mill and in combination, a casing having a charging doorway in its front wall, and also having a discharging doorway in said wall spaced apart from and below the charging doorway, a belt guiding means in the casing presenting a substantially arcuate guiding surface contiguous each of the side walls of the casing, an endless belt having a first bight at the rear of the belt guiding means and above a horizontal plane intersecting the axis of said arcuate guiding surfaces and a second bight at the front of said guiding surfaces, the belt also having a run between said bights conforming during the charging and tumbling operations to said guiding surfaces for providing a deep receptacle or pocket, a support in fixed position engaging the portion of the belt forming the first bight, a second support engaging the portion of the belt forming the second bight, means for raising the last-named support for elevating the front portion of the run above a horizontal plane intersecting the upper part of the discharge doorway and for lowering it to a position for causing the front portion of the strand to travel in a path not substantially above a horizontal plane which is substantially tangential to the bottom of said arcuate guiding surfaces, means for driving the belt in one direction during charging and tumbling and in a reversed direction for discharging, and means cooperating with the belt remote from said run for maintaining the latter substantially taut.

7. In combination in a tumbling barrel, an endless conveyor having upper and lower runs, means engaging the lower run to maintain the conveyor taut, conveyor guiding mans shaping a central portion of the upper run into an arcuate formation to define a trough for receiving the work-pieces, an upper bight forming means for the conveyor at the rear of and at a level above the axis of said guiding means, a front bight forming means which is disposed at approximately the height of the axis of said guiding means during movement of the conveyor in a tumbling direction to thereby shape said trough as a deep receptacle, a pivotally mounted arm which carries said front bight forming means whereby it may be lowered to a position at which the front portion of the upper run extends substantially horizontally and tangentially from said guiding means, a shaft to which said arm is secured and by which said arm is pivotally mounted, a pawl and ratchet means connected to said shaft for releasably holding the shaft and thereby said front bight forming means in adjusted position, and means for reversing the conveyor so that the work-pieces will be discharged over said substantially horizontal portion.

8. In combination in a tumbling barrel, an endless conveyor having upper and lower runs, means engaging the lower run to maintain the conveyor taut, conveyor guiding means shaping a central portion of the upper run into an arcuate formation to define a trough for receiving the work-pieces, an upper bight forming means for the conveyor at the rear of and at a level above the axis of said guiding means, a front bight forming means which is disposed at approximately the height of the axis of said guiding means during movement of the conveyor in a tumbling direction to thereby shape said trough as a deep receptacle, a pivotally mounted arm which carries said front bight forming means whereby it may be lowered to a position at which the front portion of the upper run extends substantially horizontally and tangentially from said guiding means, a shaft to which said arm is secured and by which said arm is pivotally mounted, an oppositely acting pawl and ratchet means connected to said shaft for releasably holding the shaft and thereby said front bight forming means in adjusted position, and means for reversing the conveyor so that the work-pieces will be discharged over said substantially horizontal portion.

9. In combination in a tumbing barrel, an endless conveyor having upper and lower runs, means engaging the lower run to maintain the conveyor taut, conveyor guiding means shaping a central portion of the upper run into an arcuate formation to define a trough for receiving the work pieces, an upper bight forming means at the rear of and at a level above the axis of said guiding means, a front bight forming means which is disposed at approximately the height of the axis of said guiding means during movement of the conveyor in a tumbling direction to thereby shape said trough as a deep receptacle, movable means for adjustably supporting said front bight forming means whereby it may be lowered to a position at which the front portion of the upper run extends substantially horizontally from said guiding means, means for reversing the conveyor so that the work-pieces will be discharged over said substantially horizontal portion, and means for counterbalancing said movable means, said counterbalancing means including a sheave of gradually increasing radius, a cable connected to said movable means and passing over said sheave for rotation therewith, and a counterweight connected for exerting a torque upon said sheave, said cable reaching the sheave at its most radially distant point when the movable means is in its raised position to exert a reduced counterbalancing force at this time.

10. In combination in a tumbling barrel, an endless conveyor having upper and lower runs, means engaging the lower run to maintain the conveyor taut, conveyor guiding means shaping a central portion of the upper run into an arcuate formation to define a trough for receiving the work pieces, an upper bight forming means for the conveyor at the rear of and at a level above the axis of said guiding means, a front bight forming means which is disposed at approximately the height of the axis of said guiding means during movement of the conveyor in a tumbling direction to thereby shape said trough as a deep receptacle, a pivotally mounted arm which carries said front bight forming means whereby it may be lowered to a position at which the front portion of the upper run extends substantially horizontally and tangentially from said guiding means, means for reversing the conveyor so that the work pieces will be discharged over said substantially horizontal portion, and means for counterbalancing said pivotally mounted arm, said counter-balancing means including a sheave of gradually increasing radius, a cable connected to said pivotally mounted arm and passing over said sheave for rotation therewith, and a counterweight connected for exerting a torque upon said sheave, said cable reaching the sheave at its most radially distant point when the pivotally mounted arm is in its raised position to exert a reduced counterbalancing force at this time.

11. In a machine for cascading and tumbling a charge of rigid work pieces in a horizontally disposed deep trough, or chamber, having a wall forming a section of about 180° of the periphery of a cylinder, and for blasting the work pieces during the cascading and tumbling thereof, and in combination, a casing, a reversible endless conveyor mounted within the casing and having an upper and lower run, the major part of its upper run providing a section of approximately 180° of the periphery of a cylinder, means for guiding the upper run, said guiding means including means for supporting the upper run and the load carried thereby during its travel through the path for forming said section of the periphery of the cylinder, said supporting means including a first supporting member supported by the casing for rotation about a fixed axis in a vertical plane substantially tangential to said cylinder, said conveyor having an upper bight, a lower bight, and an intermediate bight, the upper bight being engaged and supported by said member, the intermediate bight engaging and held in said cylindrical shape by a second supporting member, a shiftable third support for the lower bight of the carrier and movable between an elevated position and a depressed position, means tending to hold the shiftable support in its elevated position with the top thereof substantially in a horizontal plane intersecting the axis of said cylindrical path, the upper part of said shiftable support when depressed being substantially in a horizontal plane tangential to the lowermost part of said cylindrical path, driving means for causing the conveyor to travel in one direction for cascading and tumbling the work pieces and in a reverse direction for effecting the discharge of the work pieces, and means for projecting a blasting stream downward upon the cascading and tumbling work pieces, the stream fanning out in a direction parallel to the axis of the cylindrical path and travelling downward substantially in a vertical plane located between the axis of the cylindrical path and the contiguous portion of the upper bight of the conveyor.

12. In a machine for cascading and tumbling a charge of rigid work pieces in a horizontally disposed deep trough, or chamber, having a wall forming a section of about 180° of the periphery of a cylinder, and for blasting the work pieces during the cascading and tumbling thereof, and in combination, a casing, a reversible endless conveyor mounted within the casing and having an upper and lower run, the major part of its upper run providing a section of approximately 180° of the periphery of a cylinder, means for guiding the upper run, said guiding means including means for supporting the upper run and the load carried thereby during its travel through the path for forming said section of the periphery of the cylinder, said supporting means including a first supporting member supported by the casing for rotation about a fixed axis in a vertical plane substantially tangential to said cylinder, said conveyor having an upper bight, a lower bight and an intermediate bight, the upper bight engaging and supported by said member, the intermediate bight engaging and held in said cylindrical shape by a second support member, a shiftable third support for the lower bight of the carrier and movable between an elevated position and a depressed position, counterbalancing means tending to hold the shiftable support in its elevated position with the top thereof substantially in a horizontal plane intersecting the axis of said cylindrical path, the upper part of said shiftable support when depressed being substantially in a horizontal plane tangential to the lowermost part of said cylindrical path, driving means for causing the conveyor to travel in one direction for cascading and tumbling the work pieces and in a reverse direction for effecting the discharge of the work pieces, and means for projecting a blasting stream downward upon the cascading and tumbling work pieces, the stream fanning out in a direction parallel to the axis of the cylindrical path and traveling downward substantially in a vertical plane located between the axis of the cylindrical path and the contiguous portion of the upper bight of the conveyor.

13. In a machine for cascading and tumbling a charge of rigid work pieces in a horizontally disposed deep trough, or chamber, having a wall forming a section of about 180° of the periphery of a cylinder, and for blasting the work pieces during the cascading and tumbling thereof, and in combination, a casing, a reversible endless conveyor mounted within the casing and having an upper and a lower run, the major part of its upper run providing a section of approximately 180° of the periphery of a cylinder, means for guiding the upper run, said guiding means including means for supporting the upper run and the load carried thereby during its travel through the path for forming said section of the periphery of the cylinder, said supporting means including a first supporting member supported for rotation about a fixed axis in a vertical plane substantially tangential to said cylinder, said conveyor having an upper bight, a lower bight, and an intermediate bight, the upper bight engaging and supported by said member, the intermediate bight engaging and held in said cylindrical shape by a second support member, a shiftable third support for the lower bight of the carrier and movable between an elevated position and a depressed position, counterbalancing means tending to hold the shiftable support in its elevated position with the top thereof substantially in a horizontal plane intersecting the axis of said cylindrical path, the upper part of said second member when depressed being substantially in a horizontal plane tangential to the lowermost part of said cylindrical path, driving means for causing the conveyor to travel in one direction for cascading and tumbling the work pieces and in a reverse direction for moving the work pieces toward and above the second member for overcoming the counterbalancing effect and moving the member to its depressed position, and means for projecting a blasting stream upon the cascading and tumbling work pieces.

14. In combination in a tumbling mill for tumbling and abrasively blasting a plurality of work articles: a casing; an endless conveyor mounted in the casing and having upper and lower runs; guide structure supporting said runs for holding the upper run in the general shape of a work-receiving trough, driving mechanism including reversing elements connected for moving the guided conveyor in endless fashion and in a selectable direction along the runs; said guide structure including a shiftable support for one side of the conveyor trough, said support being movable between two positions in one of which it holds said side of the trough up in work-holding relation, and in the other of which it holds said trough side low in work-discharging relation; blasting structure connected to direct a stream of abrasive particles into the trough to abrasively blast work articles carried therein; counter-balancing elements connected to said shiftable support for urging it in the direction that holds the trough side up, said counter-balancing elements being adjusted for holding this side up when the upper conveyor run is moving and carrying work articles toward the trough from the shiftable side, and for automatically causing this side to shift down when the conveyor is moving in the opposite direction and carries work articles onto the shiftable side; and said casing having discharge structure connected for automatically unloading the work articles thus carried onto the shiftable side.

WALTER L. KEEFER.

REFERENCES CITED

The following references are of record in the file of this patent:

UNITED STATES PATENTS

| Number | Name | Date |
|---|---|---|
| 1,567,077 | Peik | Dec. 29, 1925 |
| 2,104,055 | Peik | Jan. 4, 1938 |
| 2,197,277 | Old | Apr. 16, 1940 |

FOREIGN PATENTS

| Number | Country | Date |
|---|---|---|
| 503,706 | Great Britain | Apr. 13, 1939 |
| 520,352 | Germany | Mar. 10, 1931 |